(12) United States Patent
McGhie et al.

(10) Patent No.: US 8,181,864 B1
(45) Date of Patent: *May 22, 2012

(54) CONVERSION OF NON-NEGOTIABLE CREDITS TO NEGOTIABLE FUNDS

(76) Inventors: Sean I. McGhie, Boca Raton, FL (US); Brian K. Buchheit, Davie, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,104

(22) Filed: Jan. 26, 2012

Related U.S. Application Data (63) Continuation of application No. 11/420,255, filed on May 25, 2006, now Pat. No. 7,703,673.

(51) Int. Cl.
*G06K 5/00* (2006.01)
(52) U.S. Cl. ......... 235/380; 235/375; 235/379; 235/487
(58) Field of Classification Search ................... 235/380, 235/375, 379, 487, 486, 382
See application file for complete search history.

(56) References Cited

U.S. PATENT DOCUMENTS

| | | |
|---|---|---|
| 4,607,155 A | 8/1986 | Nao |
| 5,290,033 A | 3/1994 | Bittner |
| 5,397,125 A | 3/1995 | Adams |
| 5,564,546 A | 10/1996 | Molbak |
| 5,609,337 A | 3/1997 | Clapper |
| 5,635,696 A | 6/1997 | Dabrowski |
| 5,674,128 A | 10/1997 | Holch |
| 5,689,100 A | 11/1997 | Carrithers |
| 5,761,647 A | 6/1998 | Boushy |
| 5,774,870 A | 6/1998 | Storey |
| 5,779,549 A | 7/1998 | Walker |
| 5,823,874 A | 10/1998 | Adams |
| 5,919,091 A | 7/1999 | Bell |
| 5,935,000 A | 8/1999 | Sanchez, III |
| 5,941,771 A | 8/1999 | Haste, III |
| 5,943,241 A | 8/1999 | Nichols |
| 5,949,042 A | 9/1999 | Dietz |
| 5,980,385 A | 11/1999 | Clapper |
| 5,993,316 A | 11/1999 | Coyle |
| 6,003,013 A | 12/1999 | Boushy |
| 6,015,344 A | 1/2000 | Kelly |
| 6,048,269 A | 4/2000 | Burns |
| 6,098,837 A | 8/2000 | Izawa |
| 6,178,408 B1 | 1/2001 | Copple |
| 6,280,326 B1 | 8/2001 | Saunders |
| 6,280,328 B1 | 8/2001 | Holch |
| 6,289,261 B1 | 9/2001 | Heidel |
| 6,293,867 B1 | 9/2001 | Heidel |
| 6,306,035 B1 | 10/2001 | Kelly |

(Continued)

FOREIGN PATENT DOCUMENTS

WO W09215174 A1 3/1992

*Primary Examiner* — Edwyn Labaze
(74) *Attorney, Agent, or Firm* — Patents on Demand, P.A.; Brian K. Buchheit (57) ABSTRACT

Non-negotiable credits earned from previous interactions with an entity can be identified. A quantity of the non-negotiable credits can be converted to a quantity of negotiable funds. The converting can be performed by a different legal entity than the entity. Access to the quantity of negotiable funds can be permitted. The quantity of negotiable funds are able to be applied to one or more purchases with at least one vender that does not accept the non-negotiable credits in absence of the converting. The identifying of non-negotiable credits, the converting, and the permitting of access to the negotiable funds can be performed by computing equipment having at least one processor executing program instructions that are digitally encoded in at least one storage device.

40 Claims, 4 Drawing Sheets

U.S. PATENT DOCUMENTS

| | | |
|---|---|---|
| 6,311,976 B1 | 11/2001 | Yoseloff |
| 6,315,665 B1 | 11/2001 | Faith |
| 6,332,099 B1 | 12/2001 | Heidel |
| 6,352,175 B2 | 3/2002 | Izawa |
| 6,394,907 B1 | 5/2002 | Rowe |
| 6,533,664 B1 | 3/2003 | Crumby |
| 6,554,705 B1 | 4/2003 | Cumbers |
| 6,645,077 B2 | 11/2003 | Rowe |
| 6,648,755 B1 | 11/2003 | Luciano, Jr. |
| 6,685,559 B2 | 2/2004 | Luciano |
| 7,134,959 B2 | 11/2006 | Penrice |
| 7,200,571 B1 | 4/2007 | Jenniges |
| 2001/0044337 A1 | 11/2001 | Rowe |
| 2001/0054003 A1 | 12/2001 | Chien |
| 2002/0020965 A1 | 2/2002 | Potter |
| 2002/0111210 A1 | 8/2002 | Luciano, Jr. |
| 2002/0169021 A1 | 11/2002 | Urie |
| 2002/0198043 A1 | 12/2002 | Chowdhury |
| 2006/0046827 A1 | 3/2006 | Saffari |
| 2006/0052150 A1 | 3/2006 | Hedrick |
| 2007/0167218 A1 | 7/2007 | Rothschild |

CONVERSION OF NON-NEGOTIABLE CREDITS TO NEGOTIABLE FUNDS

CROSS-REFERENCE TO RELATED APPLICATIONS

This continuation application claims the benefit of U.S. patent application Ser. No. 12/720,743 filed 10 Mar. 2010 entitled "Conversion of Non-Negotiable Credits Earned from a Game of Chance to Negotiable Funds", which claims the benefit of U.S. patent application Ser. No. 11/420,255 filed 25 May 2006 entitled "Web Based Conversion of Non-Negotiable Credits Associated with an Entity to Entity Independent Negotiable Funds". The entire contents of U.S. application Ser. No. 12/720,743 are incorporated by reference herein.

BACKGROUND

The present invention relates to the field of fund conversion and, more particularly, to the conversation of non-negotiable credits to negotiable funds.

Entities often reward consumers for utilizing their services with entertainment credits. These non-negotiable credits can often be applied towards products and/or services provided by a granting entity or its affiliates. For example, entertainment credits can be redeemed for prizes offered in a winnings storefront of an entertainment site. The entity offering the reward can be a gambling institution and the entertainment credits can be earnings from wagers while playing a game of chance.

Many problems are inherent to the current techniques for the redemption of entity provided credits. One such problem is the restriction on usage to goods and/or services of the entity. That is, a consumer may have no need for the products or services listed by the entity for which the non-negotiable credits can be redeemed. Further, additional restrictions and limitations can be placed upon the non-negotiable credits that lessen the usefulness of non-negotiable credits from the consumer's perspective.

Another problem encountered by consumers when redeeming non-negotiable credits is time. Once a consumer submits a request to redeem their non-negotiable credits, the consumer must wait for the entity to perform one or more actions required to fulfill their request. These steps often require days or weeks to complete. For instance, consumers participating in online entertainment sites often are required to wait a minimum of three days for their entertainment credits to be redeemed. Redemption delay can be particularly aggravating to e-commerce consumers, who by nature of an e-commerce marketplace expect rapid responses and immediate consumer gratification.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction handling system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction handling system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
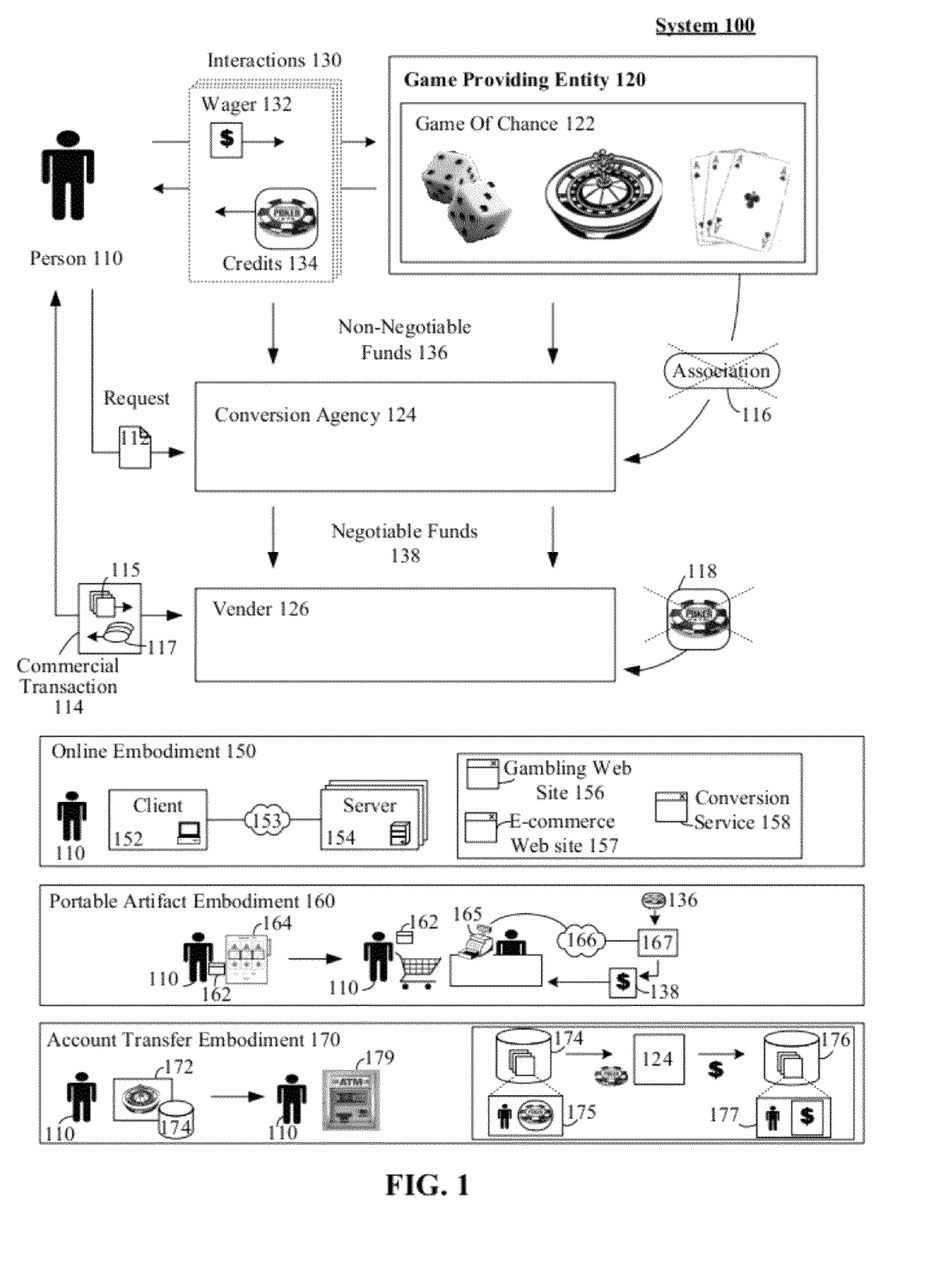
FIG. 1 is a diagram of a system in which non-negotiable funds earned from a game of chance are converted into negotiable funds in accordance with an embodiment of the inventive arrangements disclosed herein.

Referring to the figures, FIG. 1 is a diagram of a system 100 in which non-negotiable funds 136 earned from a game of chance 122 are converted into negotiable funds 138 in accordance with an embodiment of the inventive arrangements disclosed herein. In one embodiment, multiple interactions 130 can occur between a person 110 and a game providing entity 120, in which the person 110 plays a game of chance 122. During each interaction 130, a wager 132 can be made. With each successful outcome of the game of chance 122, person 110 can receive entertainment credits 134. With each non-successful outcome of the game of chance 122, the person 110 can lose their wager 132.

The entertainment credits 134 are non-negotiable funds 136. These funds 136 (e.g., the entertainment credits 134) may not be redeemable on an open market. For example, vender 126 will not accept 118 the entertainment credits 134 for commercial transactions 114. A conversion agency 124, which is not directly associated 116 with the game providing entity 120 can convert the non-negotiable funds 136 (which can be a quantity of entertainment credits 134) into negotiable funds 138. This conversion can occur in response to a request 112 by person 110.

Person 110 can conduct a commercial transaction 114 with vender 126. During the transaction 114, the person 110 can specify a user-selected set of requests 115 for goods and/or services 117 of the vender 126. The goods and/or services 117 can cost a quantity of negotiable funds 138, which are provided to the vender 126. In one embodiment, the negotiable funds 138 can be provided directly to the vender 126 by the conversion agency 124. In another, the negotiable funds 138 can be provided by the conversion agency 124 to person 110, who provides these funds 138 to the vender 126.

Numerous embodiments exist for conducting the conversions as described herein, a few of which are shown as embodiments 150, 160, and 170. Embodiment 150 shows an online embodiment, where a person 110 can interact (130) with a gambling Web site 156 to play the game of chance 122. The commercial transactions 114 can be conducted via an e-commerce Web site 157. Additionally, the conversion agency 124 can implement a software based conversion service 158, which performs the conversion of the non-negotiable funds 136 into the negotiable funds 138. The Web sites 156, 157 and service 158 can run within one or more servers 154. These servers 154 can be connected to a client 152 via a network 153, where the client 152 is a computing device that user 110 interacts (130 and/or 114) with.

In one configuration of embodiment 150, the conversion service 158 can be linked to a payment option present in the E-commerce Web site 157, which operates in a manner similar to PAYPAL, GOOGLE CHECKOUT, and the like. That is, a payment option can be presented that permits goods/services of vender 126 to be purchased using (at least in part) funds 138 converted from entertainment credits 134, which were earned from the game of chance 122.

Embodiment 160 shows a portable artifact embodiment, where a person 110 stores entertainment credits 134 from the game of chance 122 upon a portable artifact 162, which can be a physical card with a magnetic strip, a RFID storage device, a flash memory card, or other tangible artifact able to store digitally encoded (or even analog encoded) data. Machines 164 upon which the games of chance 122 are played can include a reader/writer able to alter content stored on the portable artifact 162. Thus, wagers 132 can be made from value stored on the artifact 162 and earnings (credits 134) can be recorded on the artifact 162. The person 110 can thereafter shop at a storefront of vender 126 and present a cashier 164 with the artifact 162. A cash register 165 used by the cashier 164 can be connected to a network 166. The conversion agency 124 can have a network element 168 connected to the network 166, which converts non-negotiable funds 136 on the artifact 162 into a quantity of negotiable funds 138 needed to complete the commercial transaction 114 conducted via the register 165 and cashier 164. From the perspective of the vender 126, the transaction 114 conducted via the register 165 is a "standard" transaction that results in the vender 126 receiving suitable negotiable funds 138 for providing the goods/services 117 to person 110.

Embodiment 170 shows an account transfer embodiment 170, where a person 110 plays a game of chance 122. Earnings (134, 136) from the game of chance 122 are recorded within a tangible data store 174 associated with the game providing entity 120. This data store 174 can include an account 175 for the person 110, which tracks an amount of entertainment credits 134, which are non-negotiable funds 136, of the person 110. Conversion agency 124 can directly access the account 175 of data store 174 and can convert a quantity of credits 134 into negotiable funds 138, which are recorded in a tangible data store 176 that is not directly associated with entity 120. The data store 176 can include an account 177 for the person 110, which contains an amount of negotiable funds 138, of the person 110. A person 110 can conduct commercial transactions 114 via a machine 179, such as a kiosk, an ATM machine, etc., which involve funds of account 177 changing. In one embodiment, the goods/services 117 received from person 110 in embodiment 170 can include cash (such as from an ATM machine). This cash can be an amount of cash-back received during transaction 114, can be the transaction 114 itself and may involve a transaction fee, which is extracted from account 177 by machine 179.

The embodiments 150-170 are for illustrative purposes only and are not intended to be (or to be construed as being) exhaustive or comprehensive. For example, any combinations of the embodiments 150, 160, 170 are to be considered within scope of the disclosure. Thus, a game of chance 122 can be conducted via a gambling Web site 156 (per embodiment 150), where a commercial transaction 114 using the converted entertainment credits 134 per agency 124 can be conducted at a storefront, where a cashier 164 interacts (130) with person 110. In another contemplated configuration, the game of chance 122 can be conducted with a machine 172 that places credits 134 in account 175 (per embodiment 170), which are converted and used to buy goods/services 117 via an e-commerce Web site 157 (per embodiment 150). In another contemplated configuration, entertainment credits earned via machine 164 and placed on artifact 162 (per embodiment 160), which can be placed in a machine 179, such as an ATM (per embodiment 170) to extract funds 138, which are converted (by agency 124) from the credits 134 stored on artifact 162.

In one embodiment, the conversion agency 124 can be compensated (e.g., charge a processing fee) for converting the non-negotiable funds 136 to negotiable funds 138. This fee can be paid to conversion agency 124 by the game providing entity 120, the person 110, and/or by the vender 126.

As used herein, a game of chance 122 can be a game in which an outcome is at least partially determined by random variables rather than strictly by strategy. There can be a level of "skill" or strategy involved in a game of chance 122, which can increase a person's 110 odds of a positive outcome. Common devices used in a game of chance 122 to add a significant random variable include dice, spinning tops, playing cards, roulette wheels, numbered balls drawn from a container, use of a computer or machine generated random number, and the like. Games of chance can also involve betting on an outcome of sports events and other such competitive games having an uncertain outcome.

Many (but not all) games of chance 122 are designed so that statistical odds favor the "house" or the game providing entity 120. That is, statistically, a large set of interactions 130 involving wagers 132 and credits 134 (assuming for the moment that the wagers 132 are credit 134 based wagers) will result in a net gain of credits 134 to the game providing entity 120 receiving more credits 134 (as wagers 132) than they provide (as winnings) over a relatively large set of interactions 130. Stated differently, a game of chance 122 can have mathematically-determined odds that ensure the house (e.g., game providing entity 120) has at all times an advantage over the players (e.g., person 110). This can be expressed more precisely by the notion of expected value, which is uniformly negative (from the player's (person 110) perspective). This advantage is called the house edge. In games of chance 120 such as poker where players (110) play against each other, the house (entity 120) takes a commission called the rake.

A game of chance 122 does not necessarily involve a wager 132, though it may. For example, sweepstakes are a type of a game of chance 122, which may (e.g., lottery) or may not (e.g., promotional sweepstakes) involve a wager 132. A promotional sweepstakes can be a marketing promotion targeted towards both generating enthusiasm and providing incentive reactions among customers by enticing consumers to submit free entries into drawings of chance that are tied to product or service awareness wherein the featured prizes are given away by sponsoring companies.

A game of chance 122 is defined herein to include any type of gambling game or event. In many jurisdictions, local as well as national, gambling (e.g., games of chance 122) are banned, heavily controlled by licensing, and/or are subject to government regulations and restrictions. Under US federal law, gambling is legal in the United States, and states are free to regulate or prohibit the practice. Thus, any event of uncertain outcome that is subject to state (or federal) regulations under a gambling statute is to be considered a game of chance 122 and within scope of the inventive arrangements (and claims) detailed herein. Because American Indian reservations are considered federally granted lands not subject to state regulation in the same way as other lands, many reservations geographically located in states that prohibit gambling (e.g., games of chance 122) are permitted to provide these games of chance 122, since the lands are not subject to state gambling laws. Similarly, cruise ships that travel outside state jurisdictions, often permit gambling (considered a game of chance 122 for purpose of the claims/disclosure) once the ships are located in international waters.

Games of chance 122 can involve a variety of machines (e.g., 164, 172, server 154 providing Web site 156). In many instances regulations (typically under state gambling statutes) can impose that odds in these gaming devices be statistically random, which helps to prevent manufacturers from making some high-payoff results impossible.

Games of chance 122 can include, but are not limited to, the following types of gambling: casino games, table games, fixed odd betting, pari-mutuel betting, sports betting, and the like. Specific games of chance 122 include, but are not limited to, Craps, Roulette, Baccarat, Blackjack, Poker, Pachinko, slot machines, Video poker, Bingo, Keno, dead pool, lotteries, pull-tab games and scratch cards, Mahjong, card games (e.g., Liar's poker, Bridge, Basset, Lansquenet, Piquet, Put, Teen patti), carnival games (e.g., The Razzle or Hanky Pank), coin tossing games (e.g., Head and Tail, Two-up), confidence tricks (e.g., Three-card Monte or the Shell game), dice-based games (e.g., Backgammon, Liar's dice, Passe-dix, Hazard, Threes, Pig, or Mexico), horse or greyhound racing, sports outcome betting, and the like.

Game providing entities 120 include any entity providing a game of chance 122 to others (person 110), where entertainment credits 134 can be earned. Game providing entities 120 can include casinos, cruise ships, States (for lottery, scratch off games, etc.), churches (running bingo games, for example), race tracks, online gambling site providers, slot-machine houses, carnivals, gambling parlors, companies (for promotional sweepstakes), High Schools (for raffles), and the like.

The wager 132 can be bet in an outcome of winning a game of chance 122. The wager 132 can risk money, previously earned entertainment credits 134 or something of material value on an event with an uncertain outcome with an intent on winning additional money, credits 134, and/or material goods/services. Typically the outcome of a wager 132 is evident within a short period (such as a duration of the game of chance 122). An amount of entertainment credits 134 earned from winning the game of chance 122 can vary in direct proportion to an amount of the wager (or the stake, which is placed at risk against the uncertain outcome.) A wager 132 can have odds associated with it.

Entertainment credits 134 are non-negotiable funds 136 that generally have no value outside of an environment (building, Web site, etc.) of the game providing entity 120. For example, casinos (one embodiment of entity 120) generally utilize casino tokens, chips, or plaques to represent a quantity of entertainment credits 134. Online gambling sites 156 (and electronic gambling devices) often provide an account to a person 110, where entertainment credits 134 are managed within this account in a computer readable storage medium.

Use of entertainment credits 134, such as casino tokens, can be more convenient then use of negotiable funds 138 for many reasons. For example, use of entertainment credits 134 makes theft and counterfeiting more difficult. Entertainment credits (which when having a physical representation are often a uniform size and weight) can be relatively easy to stack, count, etc. Additionally, studies have proven people (110) gamble more freely (play games of chance 122 with larger wagers 132 and frequency), when entertainment credits 134 than when wagering 132 with cash or other negotiable funds.

Additionally, use of entertainment credits 134, can have legal benefits that can permit entities 120 to conduct games of chance 122, which would be prohibited if negotiable funds 138 were utilized instead of entertainment credits 134. That is, numerous legal statutes and regulations exist that are more restrictive when gambling earnings are in a form of negotiable funds 138. For example, the Unlawful Internet Gambling Enforcement Act (UIGEA) of 2006 prohibits many online gambling activities with negotiable funds 138, which are permitted with certain forms of non-negotiable funds 136. For example, electronic fund transfers via credit cards or debit cards related to gambling winnings are generally prohibited by US banks. Similarly, wire transfers of negotiable funds 138 earned through games of chance 122 are legally prohibited in many instances. Many of these acts explicitly prohibit the transfer of negotiable funds from gambling earnings across state lines Non-negotiable funds 136 can include any of a variety of financial instruments that are not legal currency and not governed under article 3 of the Uniform Commercial Code (UCC). For example, non-negotiable funds 136 can include IOUs issued by the game providing entity 120. In one embodiment, non-negotiable funds 136 can include secured transactions, which take a security interest on collateral owned by the game providing entity's 120 assets, which are subject to Article 9 of the UCC. In one embodiment, the non-negotiable funds 136 can include letters of credit, issued by the game providing entity 120.

Negotiable funds 138 comprise a set of negotiable instruments, which are a specialized type of "contract" for the payment of money that is unconditional and capable of transfer by negotiation. As payment of money is promised later, the instrument itself can be used by the holder in due course frequently as money. Common examples include checks, banknotes (paper money), and commercial paper. Thus, negotiable funds 138 include currency, and instruments covered by Article 3 and 4 of the Uniform Commercial Code. For a writing to be a negotiable instrument under Article 3,[1] the following requirements must be met: 1) The promise or order to pay must be unconditional; 2) The payment must be a specific sum of money, although interest may be added to the sum; 3) The payment must be made on demand or at a definite time; 4) The instrument must not require the person promising payment to perform any act other than paying the money specified; 5) The instrument must be payable to bearer or to order. Additionally, negotiable funds include commercial paper, letters of credit (governed by Article 5 of the UCC), Bills of lading (governed by Article 7 of the UCC), securities (governed under Article 8 of the UCC), and deeds and other documents. One important consideration for many negotiable instruments (funds 138) is that they are payable to a bearer on demand.

The commercial transaction 114 can be one in which wherein the quantity of negotiable funds 138 are applied to user (110) specified (via request 115, for example) purchase of a good or service 117. Stated differently, a commercial transaction can be an economic transaction where person 110 receives a good or a service from vender 126 for value. Commercial transactions 114 can include a sale of goods (117) from a storefront, a Web site, a catalog (mail order), over the phone, and the like. Transaction 114 can also include a payment for a service requested by person 110. Payment of the negotiable funds 138 during the commercial transaction 114 can occur before, after, or concurrent with the receipt (or shipping) of the goods or service 117. A contract (including specifics established by the parties (110 and 126) as well as legal defaults provided by the UCC or applicable common law/state law) between the vender 126 and person 110 established as part of the commercial transaction 114 can determine when payment (funds 138) for the goods/services 117 is due. In one embodiment, commercial transaction 114 can include transaction where currency is provided to person 110 by a vender 126 (a bank as part of an ATM transaction, for example) for a fee. This currency can be provided as a loan or as a withdrawal from an account of person 110, where the account includes the negotiable funds 138.

The conversion agency 124 can be a legal entity that converts non-negotiable funds 136 (including entertainment credits 134) into negotiable funds 138. The conversion agency 124 can lack a direct association 116 with the game providing entity 120. In one embodiment, no legal relationship of enablement of corporate identity (no parent, subsidiary, etc.) relationship can exist between the conversion agency 124 and entity 120. No fiduciary duties under corporate law can exist between agency 124 and game providing entity 120. In one embodiment, agency 124 can be geographically located outside property owned or leased by the game providing entity 120. In another, it can lease space and provide its services from entity 120 owned/leased land. In one embodiment, the conversion agency 124 can support multiple different game providing entities 120, which can be competitors of each other.

In one embodiment, the conversion agency is not a bank or similar financial institution (and may therefore be outside the guidelines established by UIGEA and other statues and regulations, which impose restrictions on banks). In one embodiment, the conversion agency 124 may be located in the same jurisdiction as the game providing entity (possibly to avoid legal entanglements/restrictions with operating in multiple or across jurisdictional boundaries) or may be located in a jurisdiction with favorable rules for performing the fund conversions.

Figure 2:
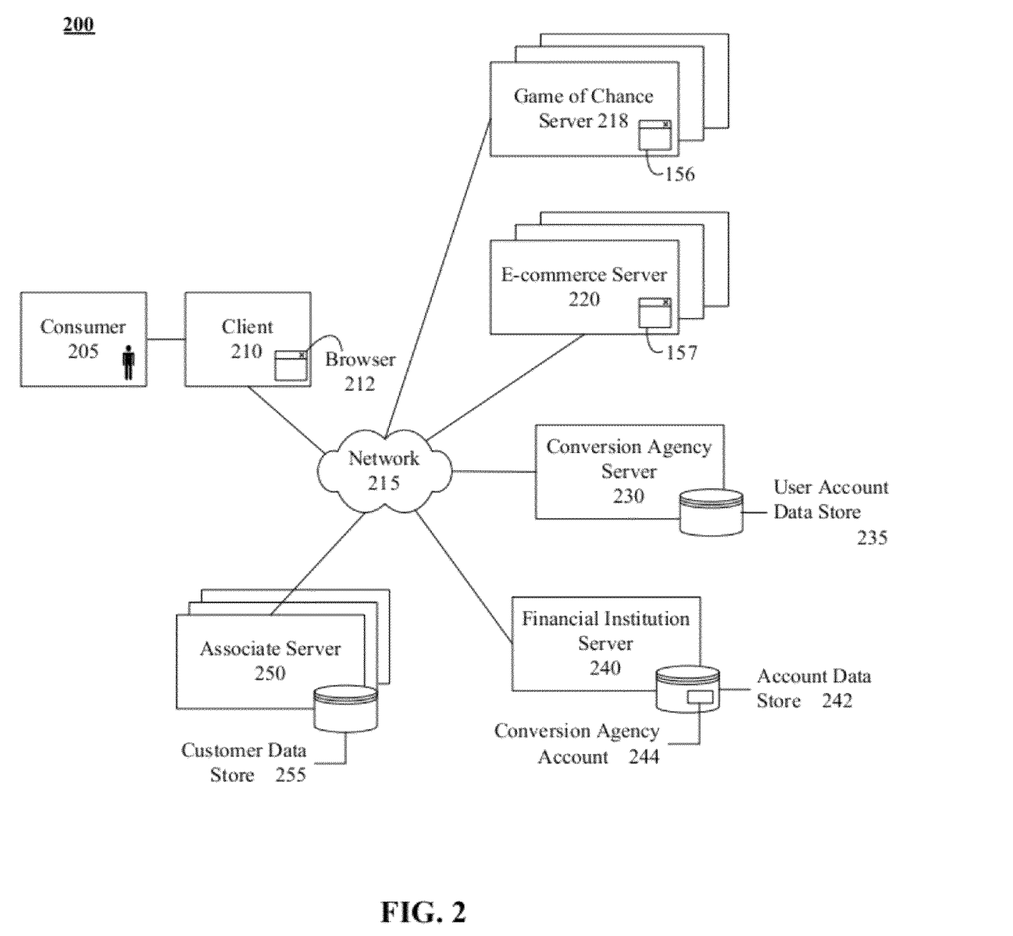
FIG. 2 is a schematic diagram of system for converting non-negotiable credits associated with a game providing entity to negotiable funds in accordance with an embodiment of the inventive arrangements disclosed herein.

FIG. 2 is a schematic diagram of system 200 for converting non-negotiable credits associated with a game providing entity to negotiable funds in accordance with an embodiment of the inventive arrangements disclosed herein. System 200 can represent a specific embodiment of system 100.

In system 200, consumer 205 can interact with a game of chance server 218, such as through a gambling Web site 156 that server 218 provides. Interactions can occur via a browser 212, rich internet interface, or other software executing upon client 210. Consumer 205 can purchase goods/services from an e-commerce Web site 157 provided by e-commerce server 220. These goods/services can be purchased using negotiable funds that a conversion agency server 230 provides. The conversion agency server 230 can convert entertainment credits resulting from earnings of a game of chance (non-negotiable funds) into the negotiable funds.

Client 210 can be any of a variety of devices including, but not limited to, a personal computer, a kiosk, a telephone, a personal data assistant (PDA), a mobile phone, and the like. Client 210 can include hardware, such as a processor, a memory, and a bus connecting them (as can server 218, 220, 230, 240, and/or 250). The hardware can execute computer program products (software/firmware) that is stored in a non-transitory storage medium. In one embodiment, client 210 can operate in a stand-alone fashion. Alternatively, client 210 can be a device that cooperatively participates in a network of distributed computing devices. Network 215 can facilitate data exchanges over wireless as well as line-based communication pathways and protocols.

In one embodiment, consumer 205 and conversion agency server 230 can interact with associate server 250, e-commerce server 220, and/or financial institution server 240 via network 215. Conversion agency server 230 includes user account data store 235 in which consumer 205 is a member. Associate server 250 includes customer data store 255 in which consumer 205 is a member. Financial institution server 240 includes account data store 242. Account data store 242 includes conversion agency account 244 corresponding to conversion agency 230.

Consumer 205 can earn non-negotiable credits from games of chance provided by server 218. These earnings (entertainment credits) can be managed by associate server 250. The quantity of these non-negotiable credits can be saved in customer data store 255. Consumer 205 can use conversion agency server 230 to convert the non-negotiable credits from associate server 250 into negotiable funds provided to the e-commerce server 220 or financial institution 240. In one embodiment, conversion agency 230 can maintain multiple accounts for the consumer 205. These different accounts can be associated with different game providing entities, and with different types of non-negotiable credits.

For example, consumer 205 can earns 500 credits from participating in an online game of chance hosted by server 218. Consumer 205 can choose to use conversion agency 230 to convert any or all of these credits to a monetary equivalent. Conversion agency 230 withdraws the necessary amount from conversion agency account 244 contained within the account data store 242 of financial institution 240 and transfers it to an account specified by consumer 205. In another example, consumer 205 uses conversion agency 230 to complete a purchase at e-commerce server 220. Again, conversion agency 230 withdraws the necessary amount from conversion agency account 244 contained within the account data store 242 of financial institution 240 and transfers it to the account of e-commerce server 220.

E-commerce server 220 can provide a Web site that supports online purchases of goods or services. In one embodiment, e-commerce server 220 can include a distinct payment option for conversion agency 230. This distinct payment option could process the conversion of credits through their Web site. Alternatively, the distinct payment option could launch an application to process the conversion of credit that is separate from their Web site. In another embodiment, associate server 250 can act as e-commerce server 220. In one embodiment, e-commerce server 220 can provide a software service (or can execute a software module) that permits the sale of goods or services, without necessarily providing a Web site. Further, e-commerce server 220 can be directly replaced with back-end system of a storefront server, serving the same relative functions as described in system 200 of facilitating the sales of goods/services.

Financial institution server 240 can be any of a variety of entities including, but not limited to, a bank, a credit card company, an investment firm, and the like. In one embodiment, financial institution server 240 can reside in the same country as consumer 205 associate server 250, and/or game of chance server 218. In another embodiment, financial institution server 240 can reside in a country other than that of consumer 205 and/or associate server 250.

As shown herein, data stores 255, 235, 242, 176, 174, and the like can be physically implemented within any type of hardware including, but not limited to, a magnetic disk, an optical disk, a semiconductor memory, a digitally encoded plastic memory, a holographic memory, or any other recording medium. Each of the data stores 255, 235, 242, 176, 174 can be stand-alone storage units as well as a storage unit formed from a plurality of physical devices, which may be remotely located from one another. Additionally, information can be stored within each data store 255, 235, 242, 176, 174 in a variety of manners. For example, information can be stored within a database structure or can be stored within one or more files of a file storage system, where each file may or may not be indexed for information searching purposes.

The network 215 can include any hardware/software/firmware necessary to convey digital content encoded within carrier waves. Content can be contained within analog or digital signals and conveyed through data or voice channels and can be conveyed over a personal area network (PAN), a local area network (LAN), or a wide area network (WAN). The network 215 can include local components and data pathways necessary for communications to be exchanged among computing device components and between integrated device components and peripheral devices. The network 215 can also include network equipment, such as routers, data lines, hubs, and intermediary servers which together form a packet-based network, such as the Internet or an intranet. The network 215 can further include circuit-based communication components and mobile communication components, such as telephony switches, modems, cellular communication towers, and the like. The network 215 can include line based and/or wireless communication pathways.

Figure 3:
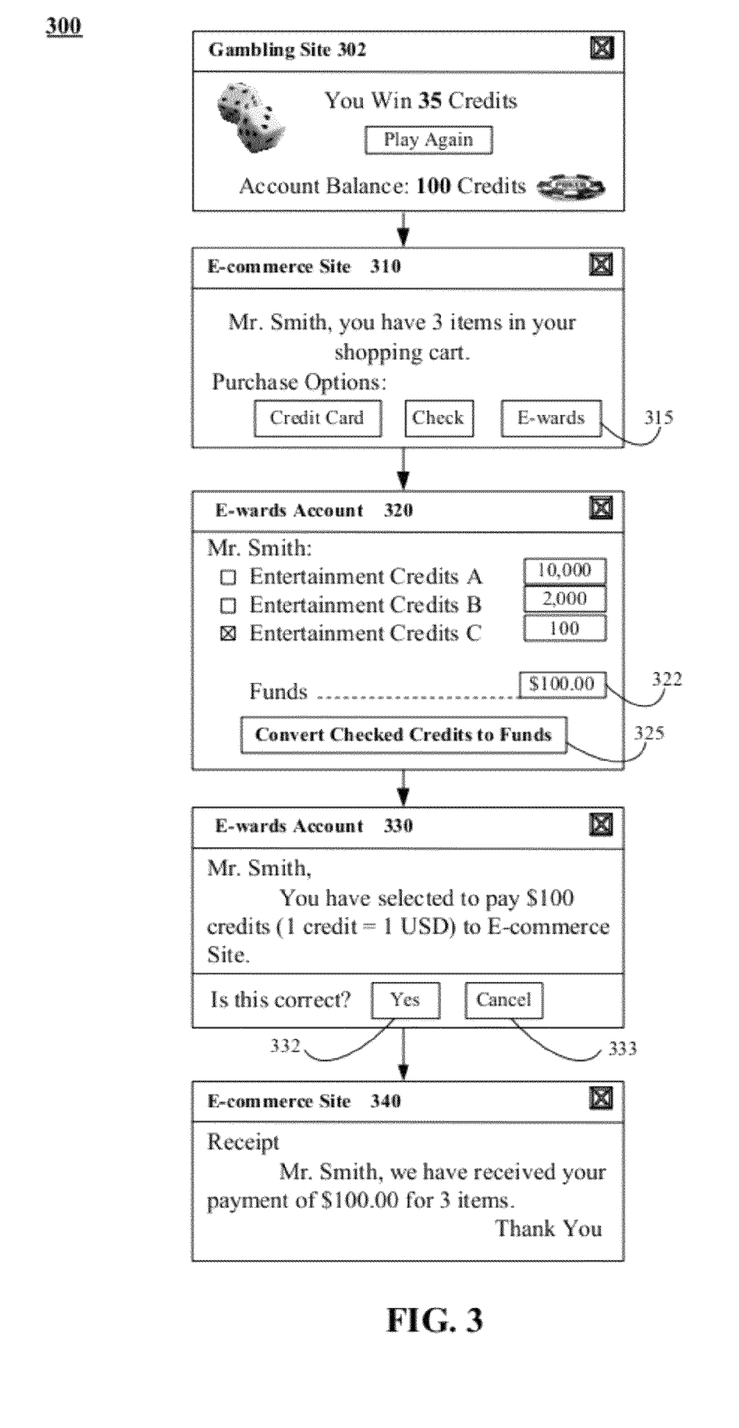
FIG. 3 is a schematic diagram of successive GUIs that illustrate the Web based conversion of non-negotiable credits associated with an entity earned from a game of chance to entity independent negotiable funds in accordance with an embodiment of the inventive arrangements disclosed herein.

FIG. 3 is a schematic diagram of successive GUIs that illustrate the Web based conversion of non-negotiable credits associated with an entity to entity independent funds in accordance with an embodiment of the inventive arrangements disclosed herein.

GUI 302 shows an interface from a gambling Web site. A quantity of entertainment credits are earned on this site, which can be later converted by a conversion agency for use in buying/selling items from a vender, who does not accept the entertainment credits.

GUI 310 can be a checkout window from an e-commerce site. GUI 310 includes payment button 315, which represents a payment option that includes the conversion of non-negotiable credits to purchase the items in the shopping cart. Selection of payment button 315 by a user can produce GUI 320.

GUI 320 can be a display window from a conversion agency. GUI 320 includes display box 322 and button 325. GUI 320 can be rendered by any of a variety of means including, but not limited to, a Web browser, a JAVA applet, a PERL script, and the like. In one embodiment, GUI 320 can be contained within the e-commerce site. GUI 320 can display the balance of non-negotiable, entertainment credits earned from one or more game providing entities. GUI 320 contains a means by which the user selects the type of non-negotiable credits to convert including, but not limited to, a set of radio buttons, a set of checkboxes, a highlighting mechanism, and the like. Display box 322 can display the monetary value of the selected non-negotiable credits. The value displayed in display box 322 can be based on preset conversion factors. Button 325 can represent the initiation of the process by which the selected non-negotiable credits are converted to negotiable funds. Selection of button 325 by a user can produce GUI 330.

GUI 330 can be a display window from a conversion agency. GUI 330 includes yes button 332 and cancel button 333. GUI 330 can be rendered by any of a variety of means including, but not limited to, a Web browser, a JAVA applet, a PERL script, and the like. In one embodiment, GUI 330 can be contained within the e-commerce site. GUI 330 can display a summary message of the transaction initiated by GUI 320. GUI 330 can include a means to continue the transaction, yes button 332, and a means to cancel the transaction, cancel button 333. Selection of cancel button 333 by a user cancels the transaction and can return the user to GUI 320. Selection of yes button 332 by a user completes the transaction initiated in GUI 320 and can produce GUI 340.

GUI 340 can be a display window from the same said e-commerce site. GUI 340 can contain a message acknowledging the successful conversion of the user's non-negotiable credits into negotiable funds for the purchase of the items in the shopping cart.

Figure 4:
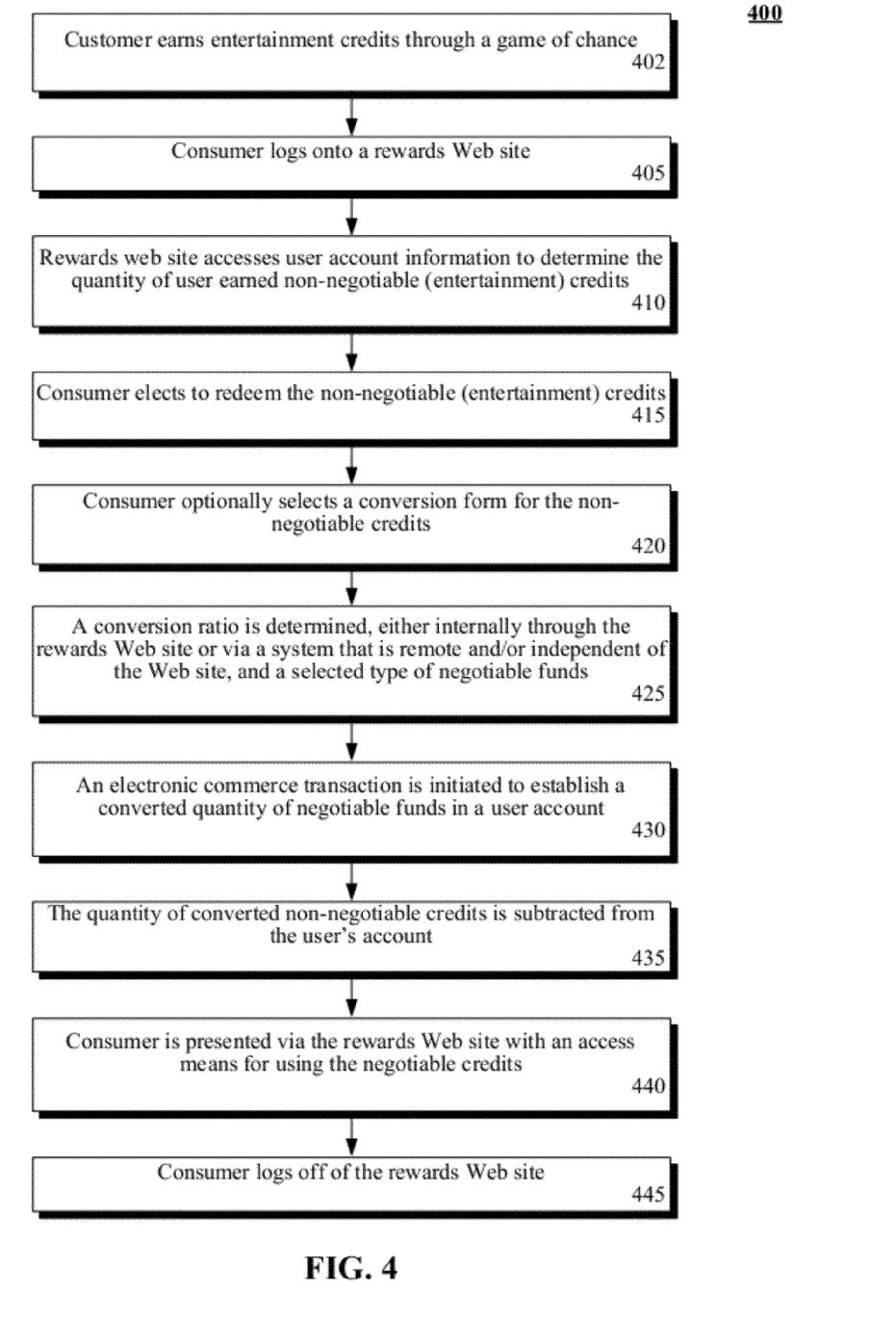
FIG. 4 is a flow chart of a method for the Web based conversion of non-negotiable, entertainment credits to negotiable funds system in accordance with an embodiment of the inventive arrangements disclosed herein.

FIG. 4 is a flow chart of a method 400 for the Web based conversion of non-negotiable, entertainment credits to negotiable funds system in accordance with an embodiment of the inventive arrangements disclosed herein.

Method 400 can begin in step 402, where a customer earns entertainment credits through a game of chance. In step 405, the consumer can logs onto a rewards Web site. In step 410, the rewards Web site utilizes the user information provided in step 405 to access the consumer's account information and display the amount of non-negotiable credits in the consumer's account. The consumer elects to redeem some quantity of non-negotiable credits in step 415. If supported by the rewards Web site, step 420 can occur in which the consumer can select the form of negotiable funds to convert the non-negotiable credits. In step 425, a ratio is determined for the conversion of the non-negotiable credits to the selected type of negotiable funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 430 to establish the converted amount of negotiable funds in a user account. The quantity of converted non-negotiable credits is subtracted from the user's account in step 435. In step 440, the rewards Web site presents the consumer with an access means for the negotiable funds. Lastly, the consumer terminates the session by logging off the rewards Web site in step 445.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method comprising:
identifying non-negotiable credits earned from previous interactions with an entity;
converting a quantity of the non-negotiable credits to a quantity of negotiable funds, wherein the converting is performed by a different legal entity than the entity; and
permitting access to the quantity of negotiable funds, wherein the quantity of negotiable funds are able to be applied to one or more purchases with at least one vender that does not accept the non-negotiable credits in absence of the converting, wherein the identifying of non-negotiable credits is performed by computing equipment having at least one processor executing program instructions that are digitally encoded in at least one storage device, wherein the converting is performed by computing equipment having at least one processor executing program instructions that are digitally encoded in at least one storage device, wherein the permitting of access to the quantity of negotiable funds is performed by computing equipment having at least one processor executing program instructions that are digitally encoded in at least one storage device.

2. The method of claim 1, wherein the previously interactions with the entity through which the non-negotiable credits are earned are interactions involving a game provided by the entity.

3. The method of claim 1, wherein the previously interactions with the entity through which the non-negotiable credits are earned are interactions involving a game of chance provided by the entity.

4. The method of claim 1, wherein the previous interactions occur via a Web site.

5. The method of claim 1, wherein the permitting access to the quantity of negotiable funds occurs via a Web site.

6. The method of claim 1, wherein the permitting of access to the quantity of negotiable funds occurs over a network.

7. The method of claim 1, further comprising:
purchasing goods or services, wherein at least a portion of the quantity of negotiable funds are applied to the purchasing of the goods or services.

8. The method of claim 1, wherein the one or more purchases are one or more e-commerce purchases.

9. The method of claim 1, wherein the converting further comprises:
providing at least a portion of the negotiable funds to the at least one vender, which the vender applies to the user specified purchases.

10. The method of claim 1, further comprising:
compensating a conversion agency performing the converting for converting the non-negotiable credits into negotiable funds.

11. The method of claim 1, wherein permitting access to the quantity of negotiable funds means:

(a) the entity providing one or more users with cash, credit, or other negotiable funds, whereby the one or more users are able to thereafter apply the cash, credit, or other negotiable funds to the one or more purchases;

(b) the entity providing the vender with cash, credit, or other negotiable funds, whereby one or more users are able to purchase goods or services from the vender using the entity provided cash, credit, or other negotiable funds; or (c) combinations of (a) and (b).

12. The method of claim 1, wherein no fiduciary duties under corporate law exist between the different legal entity and the entity.

13. The method of claim 1, wherein the non-negotiable credits are from a gambling game or are from a gambling event.

14. The method of claim 1, wherein the non-negotiable credits comprise loyalty points.

15. The method of claim 1, further comprising:
applying the negotiable funds to a financial institution account of said at least one vender responsive to the one or more purchases.

16. The method of claim 1, further comprising:
storing the non-negotiable credits upon a portable payment artifact or upon an account linked to the portable payment artifact, wherein the storing places digitally encoded information upon a storage medium associated with the portable payment artifact;
placing the portable payment artifact into a machine;
responsive to the placing, reading the digitally encoded information; and
responsive to reading the digitally encoded information, the machine triggering a network entity that is remotely located from the machine to perform the converting.

17. The method of claim 16, further comprising:
the machine providing the user with the quantity of negotiable funds during a commercial transaction in which the machine is used as user interface device.

18. The method of claim 16, further comprising:
the machine being a point of sale device used to complete the one or more purchases with the at least one vender.

19. The method of claim 16, further comprising:
the machine changing the quantity of non-negotiable credits available by subtracting the quantity of converted non-negotiable credits from a total number of available non-negotiable credits.

20. The method of claim 1, wherein the entity is a casino, and wherein the non\-negotiable credits comprise gambling earnings from games of chance played at the casino.

21. A computer system comprising:
one or more processors, one or more computer-readable memories and one or more computer-readable, tangible storage devices;
program instructions, stored on at least one of the one or more storage devices for execution by at least one of the one or more processors via at least one of the one or more memories, to identify non-negotiable credits earned from previous interactions with an entity;
program instructions, stored on at least one of the one or more storage devices for execution by at least one of the one or more processors via at least one of the one or more memories, to convert a quantity of the non-negotiable credits to a quantity of negotiable funds, wherein the converting is performed by a different legal entity than the entity; and
program instructions, stored on at least one of the one or more storage devices for execution by at least one of the one or more processors via at least one of the one or more memories, to permit access to the quantity of negotiable funds, wherein the quantity of negotiable funds are able to be applied to one or more purchases with at least one vender that does not accept the non-negotiable credits in absence of the converting.

22. The computer system of claim 21, wherein the previously interactions with the entity through which the non-negotiable credits are earned are interactions involving a game provided by the entity.

23. The computer system of claim 21, wherein the previously interactions with the entity through which the non-negotiable credits are earned are interactions involving a game of chance provided by the entity.

24. The computer system of claim 21, wherein the previous interactions occur via a Web site.

25. The computer system of claim 21, wherein program instructions to permit access to the quantity of negotiable funds are program instructions of a Web site.

26. The computer system of claim 21, wherein program instructions to permit access to the quantity of negotiable funds are program instructions to permit access over a network.

27. The computer system of claim 21, further comprising:
program instructions, stored on at least one of the one or more storage devices for execution by at least one of the one or more processors via at least one of the one or more memories, to purchase goods or services, wherein at least a portion of the quantity of negotiable funds are applied to the purchasing of the goods or services.

28. The computer system of claim 21, wherein the one or more purchases are one or more e-commerce purchases.

29. The computer system of claim 21, wherein the converting further comprises:
program instructions, stored on at least one of the one or more storage devices for execution by at least one of the one or more processors via at least one of the one or more memories, to provide at least a portion of the negotiable funds to the at least one vender, which the vender applies to the user specified purchases.

30. The computer system of claim 21, further comprising:
program instructions, stored on at least one of the one or more storage devices for execution by at least one of the one or more processors via at least one of the one or more memories, to compensate a conversion agency performing the converting for converting the non-negotiable credits into negotiable funds.

31. The computer system of claim 21, wherein program instructions to permit access to the quantity of negotiable funds means:
(a) program instructions causing the entity to provide one or more users with cash, credit, or other negotiable funds, whereby the one or more users are able to thereafter apply the cash, credit, or other negotiable funds to the one or more purchases;
(b) program instructions causing the entity to provide the vender with cash, credit, or other negotiable funds, whereby one or more users are able to purchase goods or services from the vender using the entity provided cash, credit, or other negotiable funds; or
(c) combinations of (a) and (b).

32. The computer system of claim 21, wherein the entity is a casino, and wherein the non-negotiable credits comprise gambling earnings from games of chance played at the casino.

33. The computer system of claim 21, wherein no fiduciary duties under corporate law exist between the different legal entity and the entity.

34. The computer system of claim 21, wherein the non-negotiable credits are from a gambling game or are from a gambling event.

35. The computer system of claim 21, wherein the non-negotiable credits comprise loyalty points.

36. The computer system of claim 21, further comprising:
program instructions, stored on at least one of the one or more storage devices for execution by at least one of the one or more processors via at least one of the one or more memories, to apply the negotiable funds to a financial institution account of said at least one vender responsive to the one or more purchases.

37. The computer system of claim 21, further comprising:
program instructions, stored on at least one of the one or more storage devices for execution by at least one of the one or more processors via at least one of the one or more memories, to store the non-negotiable credits upon a portable payment artifact or upon an account linked to the portable payment artifact, wherein the storing places digitally encoded information upon a storage medium associated with the portable payment artifact;
program instructions, stored on at least one of the one or more storage devices for execution by at least one of the one or more processors via at least one of the one or more memories, to place the portable payment artifact into a machine;
program instructions, stored on at least one of the one or more storage devices for execution by at least one of the one or more processors via at least one of the one or more memories, to, responsive to placing the portable payment artifact into a machine, read the digitally encoded information; and
program instructions, stored on at least one of the one or more storage devices for execution by at least one of the one or more processors via at least one of the one or more memories, to, responsive to reading the digitally encoded information, trigger a network entity that is remotely located from the machine to perform the converting.

38. The computer system of claim 37, further comprising:
program instructions, stored on at least one of the one or more storage devices for execution by at least one of the one or more processors via at least one of the one or more memories, to cause the machine to provide the user with the quantity of negotiable funds during a commercial transaction in which the machine is used as user interface device.

39. The computer system of claim 37, the machine being a point of sale device used to complete the one or more purchases with the at least one vender.

40. The computer system of claim 37, further comprising:
program instructions, stored on at least one of the one or more storage devices for execution by at least one of the one or more processors via at least one of the one or more memories, to cause the machine to change the quantity of non-negotiable credits available by subtracting the quantity of non-negotiable credits from a total number of available non-negotiable credits.

\* \* \* \* \*

UNITED STATES PATENT AND TRADEMARK OFFICE
CERTIFICATE OF CORRECTION

PATENT NO. : 8,181,864 B1  
APPLICATION NO. : 13/359104  
DATED : May 22, 2012  
INVENTOR(S) : Sean I. McGhie and Brian K. Buchheit Page 1 of 2

It is certified that error appears in the above-identified patent and that said Letters Patent is hereby corrected as shown below:

On the Title Page

Item (63) in the RELATED U.S. APPLICATION DATA the words: "continuation of Application No. 11/420,255, filed on May 25, 2006, now Pat. No. 7,703,673"

should be replaced with: "continuation in part of Application No. 11/420,255, filed on May 25, 2006, now Pat. No. 7,703,673, and a continuation of Application No. 12/720,743, filed on March 10, 2010, now Pat. No. 8,123,127, and a continuation in part of Application No. 12/759,506, filed on April 13, 2010, now Pat. No. 8,162,209, and a continuation of Application No. 13/168,814, filed on June 24, 2011, now Pat. No. 8,376,224."

In the Specification

Column 1, lines 7-15

In the CROSS-REFERENCE TO RELATED APPLICATIONS the words: "This continuation application claims the benefit of U.S. patent application Ser. No. 12/720,743 filed March 10, 2010 entitled "Conversion of Non-Negotiable Credits Earned from a Game of Chance to Negotiable Funds", which claims the benefit of U.S. patent application Ser. No. 11/420,255 filed May 25, 2006 entitled "Web Based Conversion of Non-Negotiable Credits Associated with an Entity to Entity Independent Funds". The entire contents of U.S. application Ser. No. 12/720,743 are incorporated by reference herein."

should be replaced with: "This continuation application claims the benefit of U.S. patent Ser. No. 11/420,255 filed May 25, 2006 entitled "Web Based Conversion of Non-Negotiable Credits Associated with an Entity to Entity Independent Negotiable Funds", now Pat. No. 7,703,673. Priority to Pat. No 7,703,673 is through Pat. No. 7,123,127 (filed March 10, 2010 and issued February 28, 2012) and/or Pat. No. 8,162,209 (filed April 13, Signed and Sealed this  
Twenty-fifth Day of November, 2014

Michelle K. Lee  
*Deputy Director of the United States Patent and Trademark Office*

CERTIFICATE OF CORRECTION (continued)
U.S. Pat. No. 8,181,864 B1

2010 and issued April 24, 2012) and Pat. No. 8,876,224 (filed June 24, 2011 and issued February 19, 2013, which claims priority to Patent No. 7,703,673 through Pat. No 7,123,127 and Pat. No 8,162,209). The application also claims the benefit of patent application 12/720,743 (now Pat. No. 8,123,127). The entire contents of U.S. Application Ser. No. 12/720,743 (Now Pat. No. 8,123,127) are incorporated by reference herein."